United States Patent [19]

Humphries et al.

[11] Patent Number: 4,525,642
[45] Date of Patent: Jun. 25, 1985

[54] TURBINE GENERATOR WITH STATOR END WINDING SUPPORT ASSEMBLY INCLUDING RESILIENT BRACKET

[75] Inventors: Benjamin T. Humphries, Orlando, Fla.; Andrew J. Spisak, Bethel Park, Pa.

[73] Assignee: Westinghouse Electric Corp., Pittsburgh, Pa.

[21] Appl. No.: 596,880

[22] Filed: Apr. 5, 1984

[51] Int. Cl.³ .............................................. H02K 3/46
[52] U.S. Cl. ..................... 310/260; 310/64; 310/91
[58] Field of Search .................. 310/160, 270, 51, 91, 310/43, 64, 52, 60 A, 45, 43; 336/197

[56] References Cited

U.S. PATENT DOCUMENTS

| | | | |
|---|---|---|---|
| 3,185,872 | 5/1965 | Weissheimer | 310/64 |
| 3,866,073 | 2/1975 | Gjaja | 310/260 |
| 3,988,625 | 10/1976 | Jager | 310/260 |
| 3,991,334 | 11/1976 | Cooper | 310/260 |
| 4,238,339 | 12/1980 | Khutoretsky | 310/260 |

FOREIGN PATENT DOCUMENTS

| | | | |
|---|---|---|---|
| 2231292 | 1/1974 | Fed. Rep. of Germany | 310/260 |
| 0413073 | 5/1966 | Switzerland | 310/260 |
| 1127916 | 9/1968 | United Kingdom | 310/260 |
| 0381132 | 7/1973 | U.S.S.R. | 310/260 |

Primary Examiner—R. Skudy
Attorney, Agent, or Firm—G. H. Telfer

[57] ABSTRACT

A resilient stator coil support bracket is provided particularly useful for large hydrogen innercooled turbine generators to give the end winding support assembly greater axial flexibility without substantially increasing the radial flexibility of the assembly. The support bracket includes an element secured to the core as well as an element secured to the brace that is radially outside each coil end turn with a sheet of resilient material therebetween, or there are two elements of the brace secured to the core with an intermediate element secured to the brace and the mating surfaces of all adjacent elements are spaced by sheets of resilient material, such as of an elastomer, that flexes in shear and compression modes. The bracket is tunable in the sense that the selection of the thickness and composition of the resilient material permits adjusting the natural frequency of the assembly to avoid resonance with the excitation frequency which such gas-cooled generators are sometimes susceptible. Also, the resilient bracket can be easily installed in the field to replace rigid brackets on machines in which the vibration problem has appeared.

7 Claims, 2 Drawing Figures

TURBINE GENERATOR WITH STATOR END WINDING SUPPORT ASSEMBLY INCLUDING RESILIENT BRACKET

BACKGROUND AND SUMMARY OF THE INVENTION

This invention relates generally to dynamoelectric machines and more particularly to end winding support assemblies of large turbine generators.

End winding assemblies have been variously constructed and been primarily designed to limit movement of the end turns relative to each other with the support assembly mounted in relatively fixed relation to the stator core. Part of the assembly has normally included a brace, such as of a glass fiber reinforced epoxy resin composition, in the form of a plate that extends in a radial plane on the outside of each end turn. The brace bears against the end turn and is held in place by a bracket that is rigidly secured to the brace as well as to the stator core. The bracket may be of cast metal.

The present invention addresses the specific problem of end winding assemblies, with brace and bracket elements, that are susceptible to vibration or oscillation at a resonance of the machine (such as 60 or 120 Hz) with a solution of that problem by modifying the previously rigid characteristic of the bracket in a manner that can be performed readily either in machines already in the field as well as in new manufacture.

A large machine such as a turbine generator can exhibit an unacceptably high vibration level in its end winding assembly if the assembly lacks axial flexibility and the machine is run at a natural frequency of the end winding assembly. If it is allowed to operate under such conditions, there is a susceptibility for the strands of the phase leads to become broken.

In some cases, the vibration level of an existing rigid end winding can be improved by removing some, such as each other one, of the coil support brackets that are normally provided radially outside each coil end turn. This somewhat reduces the total stiffness of the end winding but is generally not desirable because it leaves the end winding susceptible to damage from short circuit forces by introducing too much radial flexibility.

In accordance with the present invention, each coil end winding is held in place by a support bracket that is affixed to the core end face and also to a brace that is radially outside the end turn. As opposed to prior practice with totally rigid brackets, each bracket of the new arrangement has one or more resilient elements for allowing relative movement between a rigid portion of the bracket secured to the core and another rigid portion of the bracket secured to the brace. More specifically, the bracket has three elements that are arranged with two outside elements secured to the core and an intermediate element secured to the brace with mating surfaces of the adjacent elements having sheets of resilient material therebetween. The three elements of the bracket are secured together but allow a degree of flexure due to the resilient material being subjected to shear and compression forces so that there is a desired axial spring characteristic to change the natural frequency of the assembly thus avoiding excessive vibration at the running speed and frequency of the machine. The resilient bracket also allows for thermal expansion and contraction. A high degree of radial stiffness of the structure is retained, however.

The invention provides a way to achieve a controlled change of the stiffness in order to tune the end winding to a low vibration amplitude at running speed and frequency. This is achieved by the choice of the type of resilient material and its dimensions so that a wide range of stiffnesses are available. Also, the resilient support bracket, compared to previous rigid support brackets, increases the ability for the complete end winding to withstand thermal expansion relative to the core without affecting its ability to withstand short circuit loads. A further advantage is that the resilient support bracket can be easily installed on already built machines so as to minimize down time of a generator in the field by expeditiously retrofitting machines in the field that are found to have excessive vibration.

DESCRIPTION OF THE PREFERRED EMBODIMENTS

Figure 1:
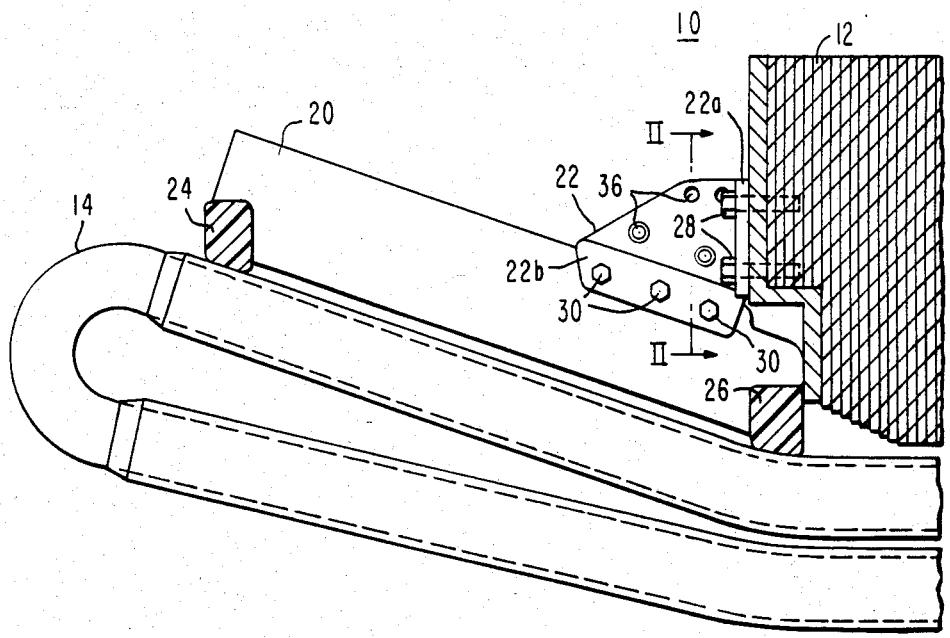
FIG. 1 is a partial, cross-sectional side view of a turbine generator in accordance with an embodiment of the present invention.

Referring to FIG. 1, part of a dynamoelectric machine is shown that includes a stator 10 with a core 12 and a stator winding 14. A rotor 16 is provided on a shaft 18 for rotation within a generally cylindrical bore of the stator. The stator winding 14 is represented by the end portions of two coil halves that include other portions within slots in the core. The end winding portion 14 extends axially from each end face of the core 12. The stator winding 14 has, for example, gas inner-cooled conductors (not illustrated in detail in the drawing) and the machine is representative of a turbine generator, such as one of a two-pole configuration.

A support assembly is provided for the end winding portion of the stator winding 14 and includes means for restraining the end winding portion against excessive motion in radial and axial directions relative to the shaft axis. The means for restraining includes a brace 20 and a bracket 22 located radially outside each coil end turn portion 14. The brace 20 is a plate-like member extending radially outside the end turn portion 14 and supported to bear against the end turn portion, or, for example, against bracing rings 24 and 26 that are disposed around all the end turns 14 at the machine end shown. The end turn 14, brace 20, and rings 24 and 26 are engaged to allow substantially no axial movement between them.

The bracket 22 has a core mounting portion or means 22a affixed to the core 12 by fasteners 28 and a brace mounting portion or means 22b affixed to the brace 20 by fasteners 30. As thus far described, the machine is generally in accordance with prior practice employing braces and rigid brackets in the end winding support assembly of gas inner-cooled windings.

The key element of the combination changed by the present invention is the support bracket 22 which results in an improved end winding support assembly and, hence, improved performance, particularly in terms of durability, of the total turbine generator.

As opposed to prior brackets which were totally rigid in securing the core and the brace, the bracket 22 employed in this invention has a resilient characteristic.

Figure 2:
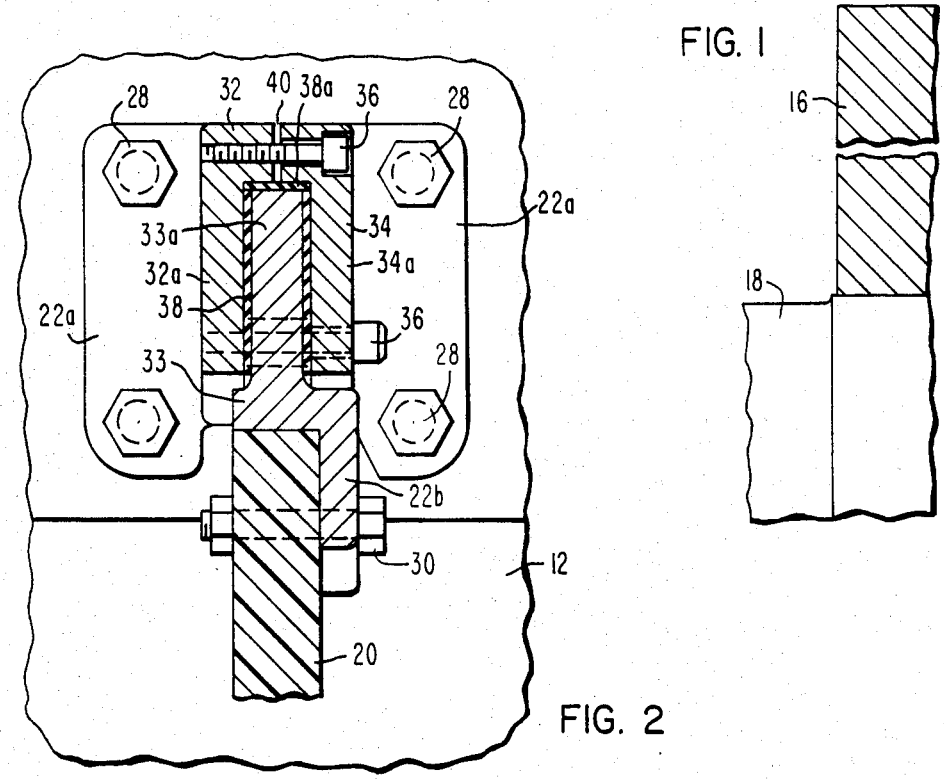
FIG. 2 is a view taken along line II—II of FIG. 1.

FIG. 2 shows more detail of an example of the assembled bracket 22 and its relation to the core 12 and brace 20. In this embodiment each bracket 22 consists of three members 32, 33 and 34 of which second member 33 is disposed between first and third members 32 and 34 that are substantially symmetrically arranged thereabout. The first and third members 32 and 34 have core mounting means 22a comprising flanges with apertures for fasteners 28 for securing those elements to the core 12. The intermediate or second member 33 has a brace mounting means 22b provided by a flange extending along the brace 20 and having apertures for fasteners 30 for securing it to the brace.

In addition, the three bracket members 32, 33 and 34 have substantially parallel and mating plate-like portions 32a, 33a and 34a that extend axially away from the core 12 and are generally in the radial plane of the brace 20. The plate-like portions 32a, 33a and 34a of the three bracket elements are held together by fasteners 36, however the securement is not rigid because intermediate member 33a has large apertures through which the fasteners run without contact. Also, a gap 40 occurs between the uppermost portions of members 32 and 34. Between each of the mating surfaces of plate-like portions 32a and 33a and plate-like portions 33a and 34a there is disposed a layer of resilient material 38, such as an elastomer (Viton rubber being one commercially available example) so that under the forces induced in operation, the portion 22b secured to the brace can move axially relative to the portion 22a secured to the core. The sheets of rubber 38 are chosen of material and thickness to provide the desired spring characteristic. In general, rubber material having a thickness of from about 30 to 200 mils (about 0.8 to 5 mm). In a typical case there will be sheets of rubber 38 of about 60 mils (about 1.5 mm) between each pair of the elements 32a and 33a and also 33a and 34a in a radial plane and, in addition, a sheet 38a oriented in the transverse direction between the parts as shown having a thickness of about 120 mils (about 3 mm). The sheets 38 and 38a can be attached by an adhesive to the plate elements prior to assembly.

The resilient elements 38 of the bracket 22 flex in shear and compression modes and allow a degree of axial movement of the end winding relative to the core but do not appreciably increase the amount of radial movement allowed.

While the mating surfaces of plate portions 32a, 33a and 34a are primarily in a radial orientation, there are preferably also smaller mating portions at the end of 33a which are also isolated by resilient material 38a.

In general, the rigid brackets of the prior art substantially limited the axial movement of the end winding assembly to an extent, in some instances, that the assembly was susceptible of radial oscillation and consequent damage. Now, with the resilient support brackets 22 the axial motion that is allowable is greater and at the frequency of operation the tendency for vibration is reduced. For example, in a generator that had natural frequencies of the end basket assembly at 122.8, 117.9 and 110.8 Hz with conventional rigid brackets, resilient tunable brackets in accordance with the present invention changed the natural frequencies to 109.9, 106.7 and 102.2 Hz, respectively.

It is therefore seen that in accordance with the present invention, the details of which may be varied from those particularly described and shown herein, that a turbine generator can be provided with an end winding support assembly that includes a bracket element for each end turn that provides a degree of resiliency for axial motion at the running speed and frequency of the machine to avoid resonance such as in the elliptical mode at about 120 Hz.

We claim:

1. A dynamoelectric machine comprising:
 a stator with a core and a stator winding, said core having a generally cylindrical bore;
 a rotor shaft mounted for rotation within said bore of said stator;
 said stator winding including portions within slots in said core and end winding portions extending in the axial direction from each end face of said core;
 a support assembly for said end winding portions comprising means for restraining said end winding portions against excessive motion in radial and axial directions, said means for restraining comprising a brace and a bracket located radially outside each of a plurality of said end winding portions;
 said brace comprising a member extending radially outside said end winding portion and supported to bear against said end winding portion;
 said bracket having a core mounting fixedly secured to said core and a brace mounting fixedly secured to said brace, said bracket also having one or more resilient elements for allowing relative movement between said core mounting and said brace mounting in the axial direction;
 said bracket core mounting comprising a first member with a flange fitting substantially flush against said core and a plate, rigidly united with said flange, extending axially from said flange;
 said bracket brace mounting comprising a second member with a flange fitting substantially flush against a surface of said brace and a plate, rigidly united with said flange, having a surface extending parallel with a surface of said first member plate;
 at least one of said resilient elements being a sheet of elastomeric material disposed between said parallel surfaces of said first and second members' plates and flexing in shear and compression modes in operation; and
 means for securing said first and second members' plates together is provided while relative axial motion therebetween is provided for by said resilient element.

2. A dynamoelectric machine comprising:
 a stator with a core and a stator winding, said core having a generally cylindrical bore;
 a rotor shaft mounted for rotation within said bore of said stator;
 said stator winding including portions within slots in said core and end winding portions extending in the axial direction from each end face of said core;
 a support assembly for said end winding portions comprising means for restraining said end winding portions against excessive motion in radial and axial directions, said means for restraining comprising a brace and a bracket located radially outside each of a plurality of said end winding portions;
 said brace comprising a member extending radially outside said end winding portion and supported to bear against said end winding portion;
 said bracket having a core mounting fixedly secured to said core and a brace mounting fixedly secured to said brace, said bracket also having one or more resilient elements for allowing relative movement between said core mounting and said brace mounting in the axial direction;

said bracket comprising first, second and third members, said first and third members being disposed with said second member therebetween, each of said first and third members serving as said core mounting and said second member serving as said brace mounting;

said first and second members having substantially mating surfaces extending axially outward from said core in a substantially radial plane with one of said resilient elements therebetween, said second and third members also having substantially mating surfaces extending axially outward from said core in a substantially radial plane with another of said resilient elements therebetween;

and means is provided for securing said first, second and third members together while allowing flexure of said resilient elements.

3. A dynamoelectric machine in accordance with claim 2 wherein:

said first and second members, and said second and third members, respectively, also have substantially mating surfaces extending axially outward from said core substantially perpendicular to said radial plane and have other ones of said resilient elements therebetween.

4. A dynamoelectric machine in accordance with claim 3 wherein:

said second member is substantially symmetrical having substantially identical portions facing each of said first and third members and said first and third members are substantially alike right and left-hand members fitting with said second member.

5. A dynamoelectric machine in accordance with claim 3 wherein:

said resilient elements are all sheets of elastomeric material of a predetermined thickness selected in accordance with a desired axial spring characteristic to avoid excess vibration at the running speed and frequency of the machine and to allow for thermal expansion and contraction.

6. A dynamoelectric machine in accordance with claim 5 wherein:

said stator winding has gas inner-cooled conductors.

7. A dynamoelectric machine in accordance with claim 6 wherein:

said stator and rotor are of a two-pole turbine generator.

* * * * *